US012277660B2

(12) United States Patent
Tal et al.

(10) Patent No.: US 12,277,660 B2
(45) Date of Patent: Apr. 15, 2025

(54) SYSTEM AND METHOD FOR IMMERSSIVE MIXED REALITY SPACE(S)

(71) Applicant: SIMBIONIX LTD., Airport City (IL)

(72) Inventors: Boaz Tal, Givataim (IL); Ariel Ben Moshe, Shoham (IL)

(73) Assignee: SIMBIONIX LTD., Airport City (IL)

( * ) Notice: Subject to any disclaimer, the term of this patent is extended or adjusted under 35 U.S.C. 154(b) by 0 days.

(21) Appl. No.: 17/774,065

(22) PCT Filed: Oct. 29, 2020

(86) PCT No.: PCT/IL2020/051123
§ 371 (c)(1),
(2) Date: May 3, 2022

(87) PCT Pub. No.: WO2021/090308
PCT Pub. Date: May 14, 2021

(65) Prior Publication Data
US 2022/0343615 A1    Oct. 27, 2022

(30) Foreign Application Priority Data

Nov. 5, 2019   (IL) .......................................... 270429

(51) Int. Cl.
*G06T 19/20* (2011.01)
*G06F 3/01* (2006.01)
*G09B 9/00* (2006.01)

(52) U.S. Cl.
CPC .............. *G06T 19/20* (2013.01); *G06F 3/011* (2013.01); *G06F 3/016* (2013.01); *G09B 9/003* (2013.01);

(Continued)

(58) Field of Classification Search
CPC ............... G06T 19/20; G06T 2219/024; G06T 2219/2021; G06F 3/011; G06F 3/016; G09B 9/003
See application file for complete search history.

(56) References Cited

U.S. PATENT DOCUMENTS 7,168,051 B2    1/2007    Robinson
9,122,391 B2    9/2015    Lee
(Continued)

FOREIGN PATENT DOCUMENTS

KR    20160124985 A   * 10/2016
WO    2019181263 A1    9/2019

OTHER PUBLICATIONS

Suma, Evan A., et al. "Making small spaces feel large: Infinite walking in virtual reality." ACM SIGGRAPH 2015 Emerging Technologies. Jan. 1, 2015. (Year: 2015).*

(Continued)

*Primary Examiner* — Xin Sheng
(74) *Attorney, Agent, or Firm* — FISHERBROYLES, LLP; Roger L. Browdy; James E. Mrose

(57) ABSTRACT

A system and a method for mixed reality immersive simulation that can be used for simulating a dynamically deformed virtual space that is extensive and spacious in comparison to the actual physical source space surrounding the participants. Said system and method may also provide a multiple spaces simulation, such as alternate combat arenas where several different participants may operate in different mixed reality sub-scenes, while sharing the same physical space as a source space, enabling maximized close quarter spaces.

18 Claims, 8 Drawing Sheets

(52) U.S. Cl.
CPC .............. *G06T 2219/024* (2013.01); *G06T 2219/2021* (2013.01)

(56) References Cited

U.S. PATENT DOCUMENTS

| | | | |
|---|---|---|---|
| 9,779,548 B2 | 10/2017 | Weisman | |
| 2004/0104935 A1* | 6/2004 | Williamson | G06V 10/10 |
| | | | 715/757 |
| 2016/0350973 A1* | 12/2016 | Shapira | G06F 3/011 |
| 2018/0053284 A1 | 2/2018 | Rodriguez | |
| 2021/0019955 A1* | 1/2021 | Aga | G06T 7/75 |

OTHER PUBLICATIONS

Fan, Yun-Chieh, and Chih-Yu Wen. "A virtual reality soldier simulator with body area networks for team training." Sensors 19.3 (2019): 451. (Year: 2019).*

C5Drones ("Top VR Treadmills Virtual Reality Locomotion", 2016, https://www.youtube.com/watch?v=qh2UdRKNqH4) (Year: 2016).*

Faraj, Noura, Jean-Marc Thiery, and Tamy Boubekeur. "VoxMorph: 3-scale freeform deformation of large voxel grids." Computers & Graphics 36.5 (2012): 562-568. (Year: 2012).*

Milgram and Kishino (1994). "Taxonomy of Mixed Reality Visual Displays", IEICE Transactions on Information and Systems, pp. 1321-1329.

Suma et al., "Making small spaces feel large: Infinite walking in virtual reality", InACM SIGGRAPH 2015 Emerging Technologies Jul. 31, 2015 (pp. 1-1).

\* cited by examiner

SYSTEM AND METHOD FOR IMMERSSIVE MIXED REALITY SPACE(S)

FIELD OF THE INVENTION

The present invention relates to immersive mixed reality systems in general and to those used for multi-participant multi-scenario teaching or training for improving skills such as in combat, triage or complex evolving narrative situations.

BACKGROUND OF THE INVENTION

A Virtual Reality (VR) system gives the participants a feeling of being in an environment different to the one they are actually physically located in. Some computer game systems have the technology to put the participant in an interactive world. For example, a player can be put in various locations such as the seat of a car, a plane or other artificial environment. In such systems, the user is essentially a spectator seeing the events happening in the world the system creates. Such experiences have been traditionally obtained by accessories providing visual and audio sensory inputs. These may be Head Mounted Displays (HMD) (e.g. HTC Vive®, Oculus Rift®) which provide a fully computer-generated stereoscopic display coupled with accommodating sound effects.

An Augmented Reality (AR) system would consist of adding additional information on a live real-world physical scene or object. This may be obtained by combining computer generated graphics with what a user perceives by regular vision. This may be obtained by an HMD having semitransparent optics, enabling an addition of another layer of computer generated optics (e.g. Google Glass®). Audio augmentation may also be used to enhance the augmented experience. Thus, participants' sensory experience comprises of real-world sensing coupled with artificial sensory data.

AR and VR may be positioned on the virtual continuum of Mixed Reality (MR) or hybrid reality (as first discussed by P. Milgram and A. F. Kishino (1994). "Taxonomy of Mixed Reality Visual Displays", IEICE Transactions on Information and Systems, pp. 1321-1329). This continuum extends from the completely real to the completely virtual environment. The placing on the continuum would depend on the rate of the immersive technology enabling the experience. In AR the real world is still experienced but with an additional layer, whereas in VR the user is isolated from the real world and to that end, in most cases, is placed during the experience in a sterile encapsulation to prevent the hampering of the virtualization submerged experience. In most cases the VR system isolates the user from the physical world and provides a unique personal experience separated from those of persons in the surroundings or in other places.

It is well recognized that training by simulation enjoys many advantages over regular real-life training. When trainee experiences mitigating life-threatening situations, that, for example, can be simulated during a virtual flight training, the trainee may benefit from arriving at said scenarios of extremities. As a result, virtual flight simulators have been found to produce much more effective training than regular flying practice. In some cases, simulation would enjoy cost effectiveness over real-life training.

Adding tactile sensory means in addition to video and audio would enhance the immersion in the virtual experience. Interacting in real time between users in same and alternate environments would further enhance the experience and emulation of a real-world interaction.

Traditional AR and VR systems are directed at gaming and entertainment which enjoy lax specification requirements and tolerance towards departure from real life emulation accuracy. In contrast, high degree AR and VR require accuracy and responsiveness which involve high cost and complexity of implementation.

AR systems require the tailoring of physical sites. For instance, the simulation of an obstacle course would require the construction of actual physical obstacles. A flight simulator requires a 6 degree of freedom moving capsule to emulate the sensation of gravity. Tailored systems require complex and costly electronic tracking and positioning devices. Though several current systems facilitate personal mobile devices (such as smartphones) as personal electronic devices, such systems are simplistic and limited and pertain in most to the gaming industry.

Another component to provide a realistic experience may be obtained by using accessories similar to real life gear. Considerable discrepancy between MR accessories and real-life tools may adversely affect the effectivity of the teaching or training exercise. The credibility of the paraphernalia directly affects how the user relates to the seriousness of the drill—is it a game or is it a simulation of a real-life situation and its perils. The system standards for specific operational tasks is different to the lower standards of systems designated for mere gaming. For example, laser tag arenas use accessories simulating weapons though such accessories do not resemble the touch-and-feel of an actual rifle weapon. Simulating accessories commonly lack in dynamics of use (such as ballistic trajectory or recoil effect). Although VR systems indeed are believed to mark their major portion in the gaming sector, there are several instances where VR is applied in other material fields such as in the medical field. For example, 3D models are assessed in a VR environment by surgeons as a preparation for conducting operations. On the other hand, AR systems are known to be implemented in actual medical procedures (see for instance the da Vinci® surgical system).

Improved speed and scope of computing and technology capabilities have substantially improved immersion capabilities. The development of computing power (specifically real time complex calculations), the ubiquity of high-quality graphic display means as well as holographic capabilities and tactile input accessories have intensified the research into the benefits of using MR immersion tools to simulate real life experiences.

There are several factors needed to have a person's brain perceive as being in a different, immersive, reality, while display being a main component. Primarily a 3-dimensional display is a prominent means to create such perception, nevertheless, a 3D all-round display does not in itself creates an immersive experience. Tracking motion and primarily head and eye movement can alter the 3D headset display accordingly. Real time rendition of moving images, effective tactile feedback, interactivity of sensory inputs in accordance with participants' personal parameters (temperature, sweating, breathing, hyperventilation, brain waves, nerve electric rate, vital signs, etc.), as well as interactive scene adaptation may give to an effective simulation.

Most VR experiences are catered for single participant immersion. The system simulates the environment of one user in accordance with participant's movements and reactions. On the whole the immersive VR experience is of isolation. Such isolation prevents from interacting with other persons in the real world whether experiencing a corresponding VR experience or not.

It has been recognized that using collaborative VR technologies can be an efficient way to work together where users are in separate different remote geographical locations (https://venturebeat.com/2017/10/11/3-reasons-why-vrs-killer-app-will-be-collaborative/). Some systems have extended the experience to a team-based VR experience (e.g. Virtual Room: https://virtual-room.com/en/) where several people can perform a joint mission by communicating and working together but not sharing the same physical space. Each participant has their own dedicated room, specially designed and equipped with virtual reality gear. Participation in the game is by standing up and moving around, searching for items, manipulating objects and collaborating with fellow team members.

Collaborative VR/AR is also used for collaboration between co-workers in different locations. An example of a shared virtual workspace connecting several sites around same 3D project may be found at https://www.techviz.net/ collaborative Immersed in their own 3D system, participants from different locations will see each other, visualize and work on the same 3D model, from any 3D application (such as Catia, NX, Creo, Navisworks) in real time coupled with various VR apparatus (Immersive Room, HTC Vive, video display walls). This software is directed at improving communication between coworkers and to pursue decision and validation processes without physical meeting. TechViz VR collaboration can also be used to provide remote training, in real time, at any distance. Teamwork becomes easier within the corporate structure, especially between people working from different locations around the world. Such applications enable project work-sharing where the manipulation of a 3D model is carried out by several users who can interact and make annotations on the 3D model. All users may see the same 3D model and annotations in real time but their movements and unique perspective are not necessarily shared.

Some collaborative VR systems facilitate communication of distantly located users by avatars in an artificial environment (U.S. Pat. No. 7,168,051). Such avatar communications are directed at discussions rather than actual joint operations.

Current collaborative immersive environment systems are directed at joint solving of problems. Several participants convene into one virtual environment and contribute to performing a task. Such users may be in different places. For instance, U.S. Pat. No. 9,779,548 presents an immersion system which registers location of user in the physical world to conform with the coordinates of the virtual world and thus to create a coherent VR/AR experience. When several users are in same space user location data ambiguity may occur. This problem was mitigated in U.S. Pat. No. 9,779,548 with regards to AR in mobile devices. The sharing of a mutually coherent AR was enabled by using separate mobile devices each enjoying different anchor points in the AR world (as presented also in U.S. Pat. No. 9,122,391). Each participant is rendered into the AR representation of other users by having an AR device report to other AR devices of its own orientation and distance with respect to one or more other anchors. U.S. Pat. No. 9,779,548 enables multiple participants to share the same AR session while each user is in a different location. U.S. Pat. No. 9,779,548 does not address the situation in which users are in same location and wish to join same AR session. U.S. Pat. No. 9,779,548 does not relate to a situation in which several participants in same location wish to join/have separate different immersive sessions. Where AR is concerned this may not be a problem—the AR relates to a physical terrain which is augmented by virtual components each participant in same location would have a different perspective of the current physical components depending on the slightly different positioning in space they have.

Immersive room technique is where immersive room users wear a pair of VR glasses which display a 3D image via stereoscopy. The 3D effect is rendered by displaying two images—one per eye—which allows the brain to interpret the depth of the objects. With the help of a tracking system which records the person's actions inside an immersive room, the point of view of the user is defined to display the images with the right perspective.

Current systems and methods have difficulty implementing several users in same MR environment. The co-registration of more than one user in same simulated environment may cause data ambiguity. AR systems are based on basic physical data and real-life coordinates and do not have such problems. VR systems solve such problem by placing different users in separate physical areas, such as sterile experience cubes. Quarantining multiple users for such a VR experience requires a considerable amount of physical space.

As noted, an important part of effective simulation is the interactivity between participants (such as simulating the cooperation between soldiers in battlefield or between medical experts on the operation table). The interactivity between different environments (events in one environment may affect inputs in another) is also desirable.

None of the said systems presents a system which enables several participants to enjoy interaction through different immersive environments in a cost-effective manner. Most current multi-participant solutions are tailored for specific situations (such as collaborative CAD) such systems lack flexibility for cost effective adaptation to changing simulation requirements.

The present invention relates to immersive mixed reality systems in general and to those used for multi-participant multi-scenario teaching or training for improving skills such as in combat, triage or complex evolving narrative situations which overcomes the aforementioned drawbacks.

The present invention enables several participants to use same or different virtual environments in an immersive manner while interacting and communicating between each other to obtain a completion of an operational task. The presented immersion technologies suggest a flexible cost-effective system enabling simulation of real life-threatening situations.

SUMMARY OF THE INVENTION

The present invention provides a system and a method for MR immersive simulation that can be used for simulating a dynamically deformed virtual space that is extensive and spacious in comparison to the actual physical source space surrounding the participants. Said system and method may also provide a multiple spaces simulation, such as alternate combat arenas where several different participants may operate in different MR sub-scenes, while sharing the same physical space as a source space, enabling maximized close quarter spaces. Such a scenario, for example, may include participants combating on different stories of the same virtual building, or combating on different parts of a warfare arena.

Said system and method may further include applying a safety mechanism for the purpose of possible collision detection along with the supervising of participants' movements in relation to obstacles and barriers, thus, allow a real-world type movement of participants inside a certain, possibly confined, physical space while improving MR operation and immersion sensation.

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

According to one aspect, there is provided a MR immersive system comprising a controller configured to operate at least one MR scenario and at least one sensory apparatus associated with at least one participant.

According to some embodiments, said system is deployable in an at least one source space physically occupied by the at least one participant, wherein said source space is configured to be dynamically deformed into at least one extensive and spatially altered object space, wherein said object space is conveyed to the at least one sensory apparatus associated with the at least one participant.

According to some embodiments, at least one sensor is configured to monitor the at least one participant's parameters.

According to some embodiments, the participant's parameters include participant's vital signs.

According to some embodiments, the participant's parameters include participant's bearings.

According to some embodiments, the controller is integrated into the sensory apparatus.

According to some embodiments, the sensory apparatus comprises a head-mounted display (HMD) configured to display images to the at least one participant.

According to some embodiments, the sensory apparatus comprises communication means configured to enable communication between participants.

According to some embodiments, the communication is configured to provide inter-participant and supervisor-participant communication.

According to some embodiments, the sensory apparatus comprises haptic means configured to provide tactile stimuli to the participant.

According to some embodiments, a safety mechanism prevents possible physical collisions between the participants themselves or between participants and physical objects that may be present within the source space.

According to some embodiments, the safety mechanism uses a pre-mapping of the source space.

According to some embodiments, the object space is simulated by multiple image tiles that are dynamically deformed to fit into the source space.

According to some embodiments, the multiple image tiles characteristics are optimized to reduce latency and preserve system resources.

According to some embodiments, the same source space may be used for several MR scenarios enacted at the same time.

According to some embodiments, the MR scenario is subjected to constrains resulting from measurable important scenario parameters.

According to some embodiments, a MR limitation score is calculated in accordance with the measurable important scenario parameters and in turn affect the selection of next object image tile/s that form the object space presented to the participant/s.

According to some embodiments, the object space's shape can be warped to fit a given source space while preserving said object space's measurements.

According to some embodiments, the MR scenario is configured to dynamically form an extensive object space adapted for at least one participant.

According to some embodiments, the MR scenario is configured to dynamically form at least two object sub-spaces adapted for at least two participants.

According to some embodiments, the at least two object sub-spaces are a replication of the same object space type.

According to some embodiments, the at least two object sub-spaces are a different arenas object sub-spaces.

According to some embodiments, at least two participants may simultaneously conduct different tasks while being immersed in the at least two object sub-spaces.

According to some embodiments, the at least two participants operate within the at least two object sub-spaces are provided with a real-time inter-communication.

According to some embodiments, the at least one MR scenario is configured to dynamically inter-correspond and adapt in accordance with scenario evolution and participant's actions.

According to some embodiments, the system further comprising real-life accessories.

According to some embodiments, the accessories are equipped with at least one sensing means.

According to some embodiments, the accessories are equipped with at least one haptic means.

According to some embodiments, the accessories further comprising real-life patient operation tools.

According to some embodiments, the haptic means can mimic a sensation of using and operating a real weapon.

According to some embodiments, the haptic means can mimic a sensation of being hit by another participant.

According to a second aspect, there is provided a method for conducting a MR scenario comprising the steps of operating, using a controller, at least one MR scenario that involves at least one participant present within a source space; dynamically deforming the spatial characteristics of the source space to form an extensive and spatially altered object space and conveying the at least one object space to at least one sensory apparatus associated with at least one participant.

According to some embodiments, dynamically deforming the spatial characteristics of the source space forms at least two extensive and spatially altered object sub-spaces adapted for at least two participants.

According to some embodiments, the at least two object sub-spaces are a replication of the same object space type.

According to some embodiments, the at least two object sub-spaces are a different arenas object sub-spaces.

According to some embodiments, at least two participants may simultaneously conduct different tasks while being immersed in the at least two object sub-spaces.

According to some embodiments, the steps can be conducted using off-the-self components.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION OF SOME EMBODIMENTS

Figure 1:
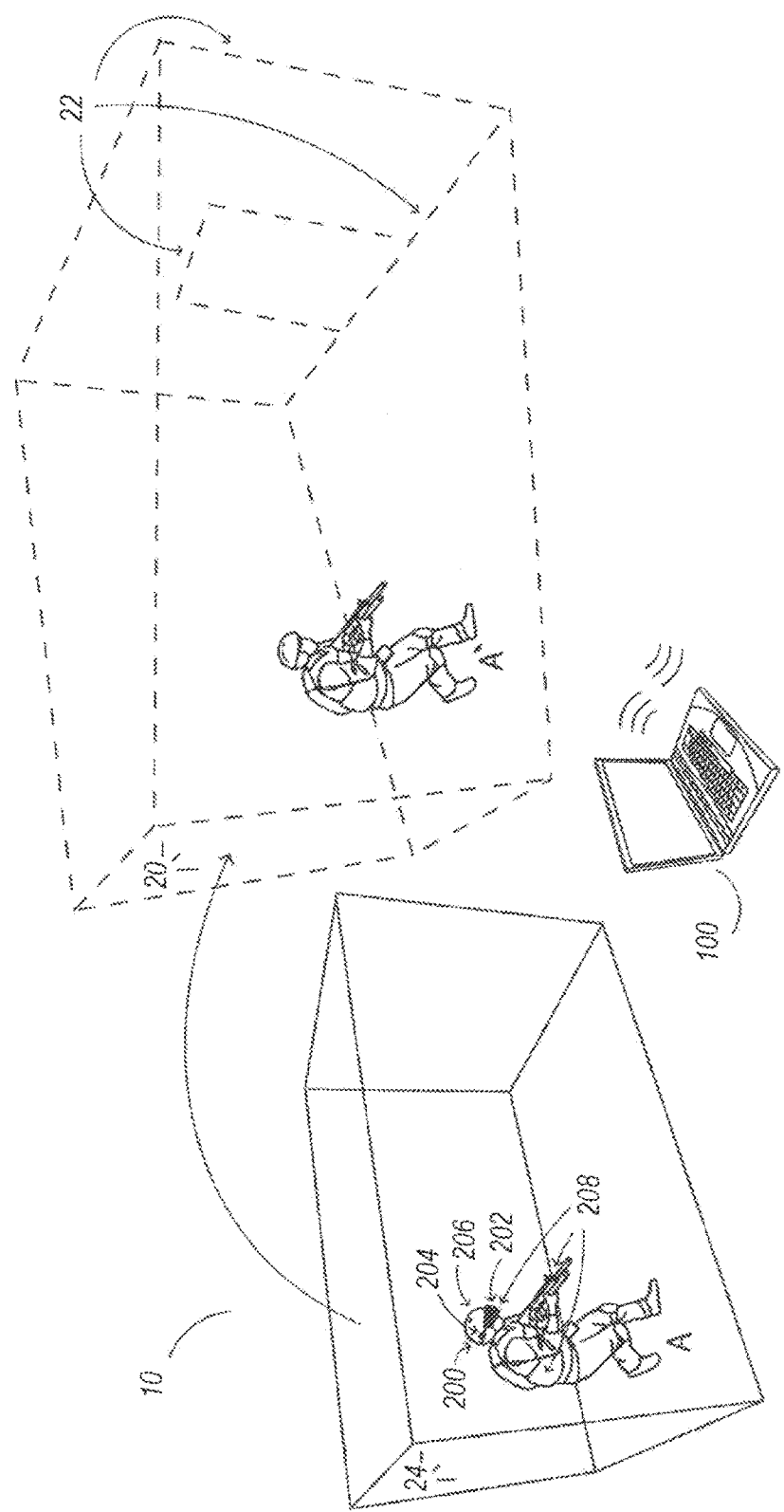
FIG. 1 constitutes a schematic perspective view of a VR scenario enacted during the use of a MR immersive system, according to some embodiments.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The term "controller", as used herein, refers to any type of computing platform that may be provisioned with a memory device, a Central Processing Unit (CPU) or microprocessor device, and several input/output (I/O) ports, such as, for example, a general-purpose computer such as a personal, laptop or a tablet computer or a cloud computing system.

The term "mixed reality scenario" or "MR scenario", as used herein, refers to a computer-generated scenario which computes an MR space and allows it to be implemented by participants. It may be described geometrically and may contain properties of any sort.

The term "sensor", as used herein, refers to any sort of sensing device able to track the participant's bearings or capture images of detect any other kind of parameters during an MR scenario which can be a VR/AR scenario or mixture thereof.

The term "source space", as used herein, refers to the actual physical space that a participant occupies and operates within. For example, a room in which the participant wears a HMD and in which the participant moves, rotates, crouches, jumps, etc.

The term "object space", as used herein, refers to the virtually modeled space that can be described by pre-generated models or by algorithms which dynamically create the object space. Modelling of said object space may be carried out in various ways employing various mathematical methods. Such modelling can be of entire spaces or of segments thereof—such segments are referred to herein as "object tiles".

The term "object space layout", as used herein, refers to a set of 3d coordinates describing a virtual shape in a 3D space, such as, for example, the floor of a room, table or staircase.

The term "trackable space", as used herein, refers to a part of the physical space, mostly, part of the source space, in which a sensor is able to track participants' motions.

The term "occupied trackable space", as used herein, refers to a part of the trackable space which is marked to be in use by participant exercising a specific virtual reality scenario.

The term "shape transformation", as used herein, refers to the process of changing a shape's coordinates in the virtual reality space without changing the shape itself. For example: movement or rotation are considered shape transformation.

The term "dynamic deformation", as used herein, refers to the process in which a certain 3D spaced shape is adaptively deformed into another 3D shape during the generated MR scenario. Without limitation, dynamic deformation of 2D shapes as part of the MR experience will be considered as a sub use case of the said 3D shape deformation. Dynamic deformation may include, but not be limited to, deformations by way of scaling, warping, rotating, folding, shrinking, magnifying, overlapping and other mathematical manipulations on 3D/2D shape matrices expressions.

The term "important scenario property/parameters", as used herein, refers to an attribute or property of the MR scenario which is measurable (a.k.a it has a score) and has some degree of importance to the creator of the virtual reality scenario. Such property may contain initial measurable value (a.k.a. Initial score) and a minimum measurable threshold value (a.k.a minimum score) under which the property will be considered as not valid anymore. Each MR scenario may include a list of ranked important properties defined by its creator. According to some embodiments, such ranking may be obtained by a scoring method.

Reference is made to FIG. 1, which constitutes a schematic perspective view of an MR scenario enacted by the use of a MR immersive system 10 according to some embodiments of the invention. As shown, MR immersive system 10 comprises 3 main devices:

1. A controller 100 such as a computer configured to execute a MR scenario and may control various devices comprising the MR immersive system 10. According to some embodiments, the controller 100 may be a separated device or may be integrated into a personal sensory apparatus 200 (disclosed hereinafter).

2. At least one personal sensory apparatus 200 configured to produce sensory output to be perceived by participant/s associated with each one of personal sensory apparatus 200 (for example, participant A depicted in FIG. 1, or participants B-G depicted in the following figures). According to some embodiments, personal sensory apparatus 200 may comprise a head-mounted display (HMD) 202 configured to produce images to be perceived by participant A associated with said HMD 202. According to some embodiments, HMD 202 can produce 3D images that simulate an object space 20. According to some embodiments, object space 20 may simulate any type of scenario in which participant A operates as part of an MR simulation. According to some embodiments, object space 20 comprises an object space layout 22 that may be any kind of shape, object or formation simulated as part of the MR scenario, such as, for example, floor, stairs, door, window, vehicle, terrain etc.

According to some embodiments, personal sensory apparatus 200 may comprise auditory means 204 such as earphones, a microphone or speakers configured to enable participant A to communicate with other participants of the immersive system 10.

According to some embodiments, the personal sensory apparatus 200 is equipped with haptic means 208 (disclosed hereinafter) configured to provide tactile stimuli to participant A in order to simulate an actual situation.

3. At least one sensor 206 configured to sense the bearings of participant A across the entire or some of a source space 24. According to some embodiments, input from sensor 206 may be processed by controller 100 and may be used to determine participant A's bearings during an MR scenario. According to some embodiments, said determined bearings may serve in simulating participant A' representation on object space 20, explained hereinafter) According to some embodiments, sensor 206 can be, for example, a motion or a tracking sensor configured to detect the bearings of the participant A or, alternatively, the bearings of some parts of the participant A's body, wherein these bearings are then simulated as part of an MR scenario.

According to some embodiments, sensor 206 can sense various parameters associated with participant A. These parameters can include, for example, the body temperature, sweating level, breathing rate, hyperventilation level, brain waves activity, nervous system electric rate, etc. According to some embodiments, sensor 206 may also sense the vital signs of participant A while immersed in an MR scenario.

According to some embodiments, the controller 100 can calculate and determine, according to the parameters or vitals detected by sensor 206, the well-being (e.g. physical and mental) status of participant A. According to some embodiments, sensor 206 can be a separated sensing device or can be integrated into the personal sensory apparatus 200.

According to some embodiments, MR immersive system 10 may comprise haptic means 208 configured to provide tactile sensation in accordance with a specific MR scenario. According to some embodiments, haptic means 208 can be implemented as part of the personal sensory apparatus 200 and configured to provide tactile stimuli to participant A's head. According to some embodiments, haptic means 208 can be implemented as part of the participant A's clothing, for example, haptic means 208 can be implemented as part of a tactical vest, and can, for example, simulate a projectile hitting the participant A at its upper torso.

According to some embodiments, haptic means 208 can be implemented in a variety of real-life accessories used by the participant A during an MR scenario, such an accessory can be, for example, an adapted weapon such as an assault rifle.

According to some embodiments, haptic means 208 implemented in real life accessories such as an assault rifle, can provide the participant A with a realistic tactile sensation, for example, a real-life feel of firing live ammunition. This may be achieved by the mimic of the recoil force associated with the use of live ammunition or by the mimic of the sensation of a magazine replacement or loading operation.

According to some embodiments, a tactile stimulus may prevent participants from harming themselves by colliding with real world physical objects (walls, stairs, corners, other participants, etc.). According to some embodiments, the MR immersive system 10 comprises a safety mechanism that uses pre-mapping of the confined physical space along with the supervising of participants' movements in relation to obstacles and barriers. According to some embodiments, said suggested safety mechanism can be archived by using a room-scale VR technology that allows a real-world type movement of participants inside a physical source space 24, thus improving the immersion sensation.

According to some embodiments, controller 100 may execute an MR scenario that may include a dynamic deformation, such as, a shape deformation of the object space 20. According to some embodiments, said dynamic deformation conducted by intervening in the registration process, meaning, intervening in the computation process conducted to synchronize coordinates between the source space 24 and the object space 20 and allow to precisely translate coordinates from the source space 24 to the coordinates of the object space 20 and vice versa. Intervening and intentionally altering the registration process may result in a dynamic deformation wherein an object space 20 perceived by the participant (participant A representation on object space 20 is marked as participant A') can be spatially altered when compared to the source space 24 physically occupied by the participant A.

According to some embodiments, the source space 24 in which the participant A executes the MR scenario, can be confined to a relatively small dimension. For example, participant A may stand inside a standard room that does not allow much free movement, in the meantime, an object space 20 of an MR scenario perceived by the participant A, undergoes a dynamic deformation in which the dimensions of source space 24, (for example, the dimensions of a standard room) are altered such that the modified object space 20 being perceived by the participant A as spacious (i.e. more extensive) than the source space 24 that the participant A physically occupies. According to some embodiments, participant A may be immersed inside an MR scenario simulating, for example, an assault or clearing up a large and spacious room while being in a confined source space 24 much smaller that the object space 20 he experiences.

According to some embodiments, the object space layout 22 can also be susceptible to dynamic deformation resulting in objects that seem larger or smaller or closer or farther than they really are. For example, a door that is a part of the object space layout 22 can be seemed, as a result of a dynamic deformation, to be placed at a greater distance than physically possible in the confined dimensions of source space 24 that participant A physically occupies, thus contributing to the sensation that participant A operates in a spacious object space 20. According to some embodiments the object space layout 22 dynamic deformation may be carried out in accordance with important scene parameters.

(It should be emphasized that the aforementioned disclosure regarding the devices and operation of the MR immersive system 10 may also apply for each of participants B-G disclosed hereinafter).

Figure 2:
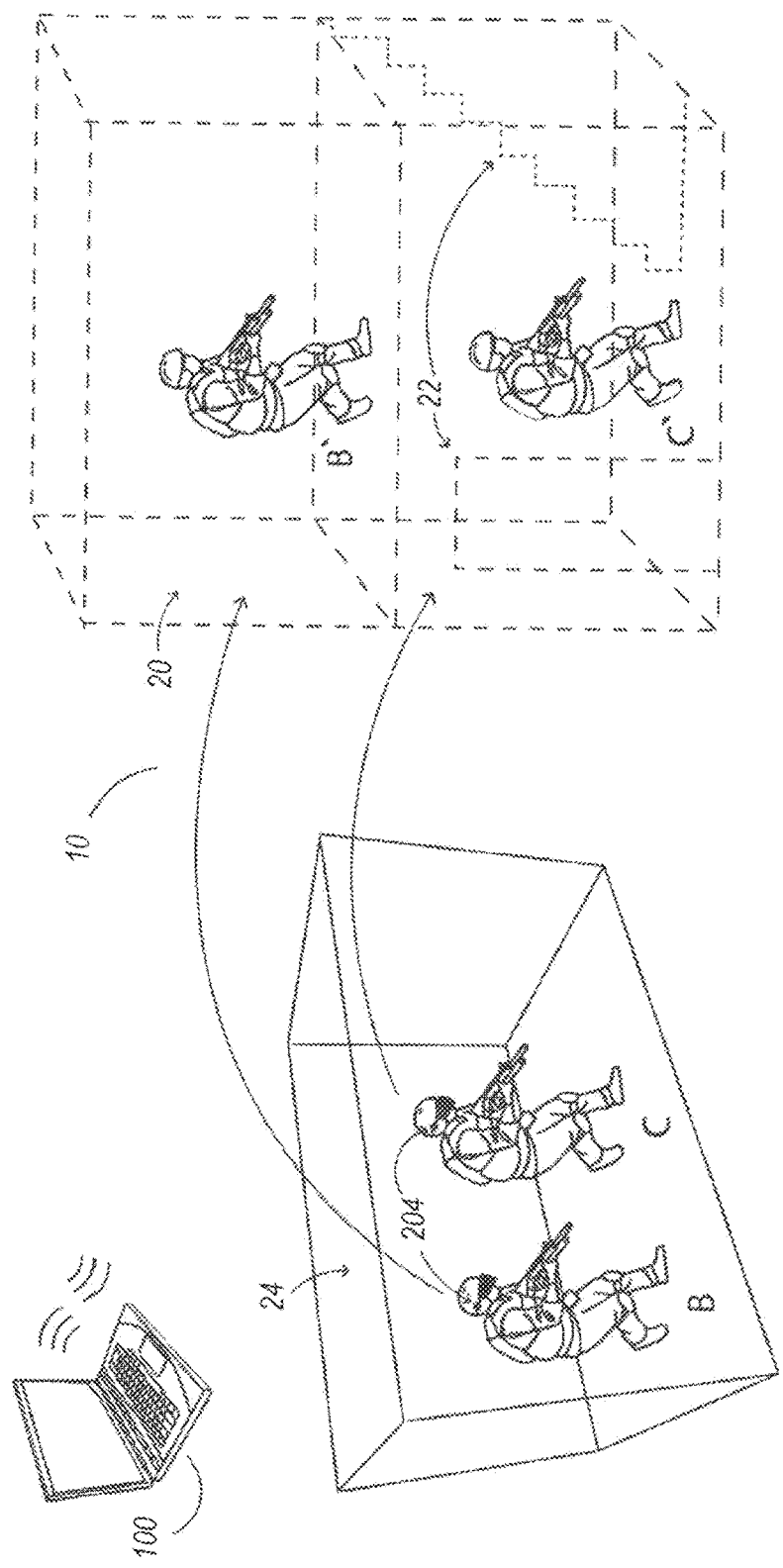
FIG. 2 constitutes a schematic perspective view of a VR scenario enacted during the use of a MR immersive system, according to some embodiments.

Reference is made to FIG. 2, which constitutes a schematic perspective view of a MR scenario enacted by the use of a MR immersive system 10 according to some embodiments of the invention. As shown, at least two participants, B and C, are occupying a restricted source space 24. According to some embodiments, controller 100 may execute a dynamic deformation to create an MR scenario that comprises extensive object space 20 having more than one object sub-spaces or in other words, a modified object space 20. For example, said MR scenario may be a tactical operation involving rooms clearing task as part of an urban warfare operation. According to some embodiments, the rooms to be cleared can be located on different stories at the same building and an MR scenario may divert participant B to climb up a staircase and clear a room located on the first floor, while participant C may be instructed to clear the room located on the ground floor. According to some embodiments, the MR scenario may comprise a staircase or a door as part of the object space layout 22, wherein the staircase may provide participant B with a real sensation of climbing to the first floor and the door may provide participants B and C with a real sensation of entering the building.

According to some embodiments, participants B and C are immersed in a VR scenario that enables each one of them to conduct a similar task within the modified object space 20, e.g. on different stories of the same building (participants' representations on object space 20 are marked as participant B' and participant C' respectively). According to some embodiments, participants B and C do not have a direct line of sight between each other. In this case, participant B can communicate with participant C (and vice versa) through auditory means 204. The aforementioned MR scenario enables at least two participants to explore and conduct similar tasks within the modified object space 20 while physically being within the same restricted source space 24 or, alternatively, within two separated restricted source spaces 24.

Figure 3:
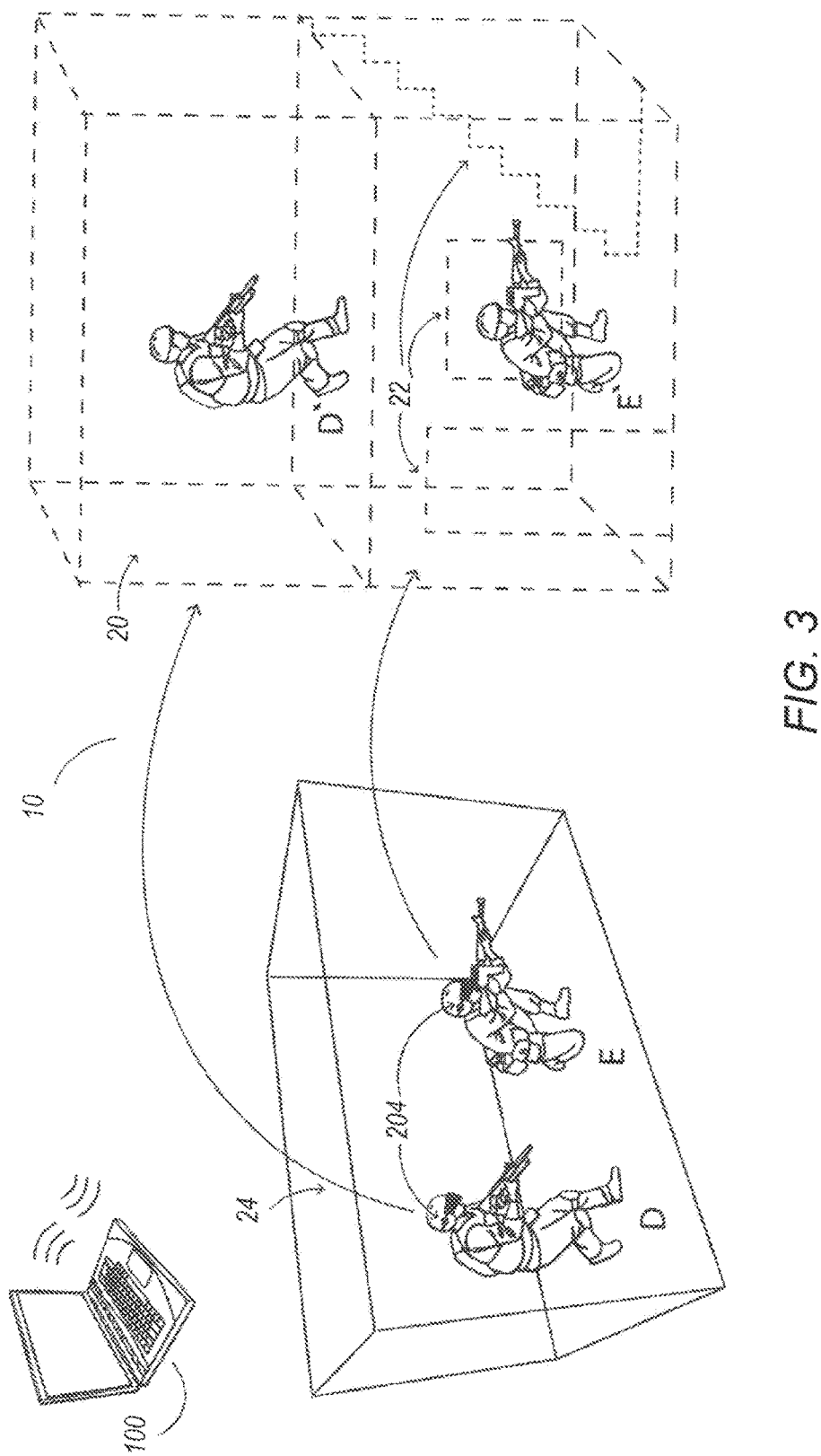
FIG. 3 constitutes a schematic perspective view of a VR scenario enacted during the use of a MR immersive system, according to some embodiments.

Reference is made to FIG. 3, which constitutes a schematic perspective view of an MR scenario enacted by the use of a MR immersive system 10 according to some embodiments of the invention. As shown, at least two participants, D and E, occupy a restricted source space 24. According to some embodiments, controller 100 may execute a dynamic deformation to create an MR scenario that comprises extensive object space 20 having more than one object sub-spaces or in other words, a modified object space 20. For example, said MR modified scenario may be a tactical operation involving a building clearing task as part of an urban warfare operation. According to some embodiments, the rooms to be cleared can be located on different stories at the same building and an MR scenario may instruct participant D to climb up a staircase and clear a room located on the first floor, while participant E may be diverted to reconnoiter through a window of a room located on the ground floor. According to some embodiments, the MR scenario may comprise a staircase, a door or a window as part of the object space layout 22 wherein the staircase may provide participant D with a real sensation of climbing and the door and window may provide participant E a real sensation of entering and reconnoitering the building's surrounding.

According to some embodiments, participants D and E are immersed in an MR scenario that enables each one of them to conduct different tasks on modified object space 20, e.g. on different stories of the same building (participants' representations on the object space 20 are marked as participant D' and participant E' respectively) According to some embodiments, participants D and E may do not have a direct line of sight toward each other. In this case, participant D can communicate with participant E (and vice versa) through auditory means 204. The aforementioned MR scenario enables at least two participants to conduct different tasks within the modified object space 20 while physically being in a restricted source space 24 or, alternatively, within two separated restricted source spaces 24.

Figure 4:
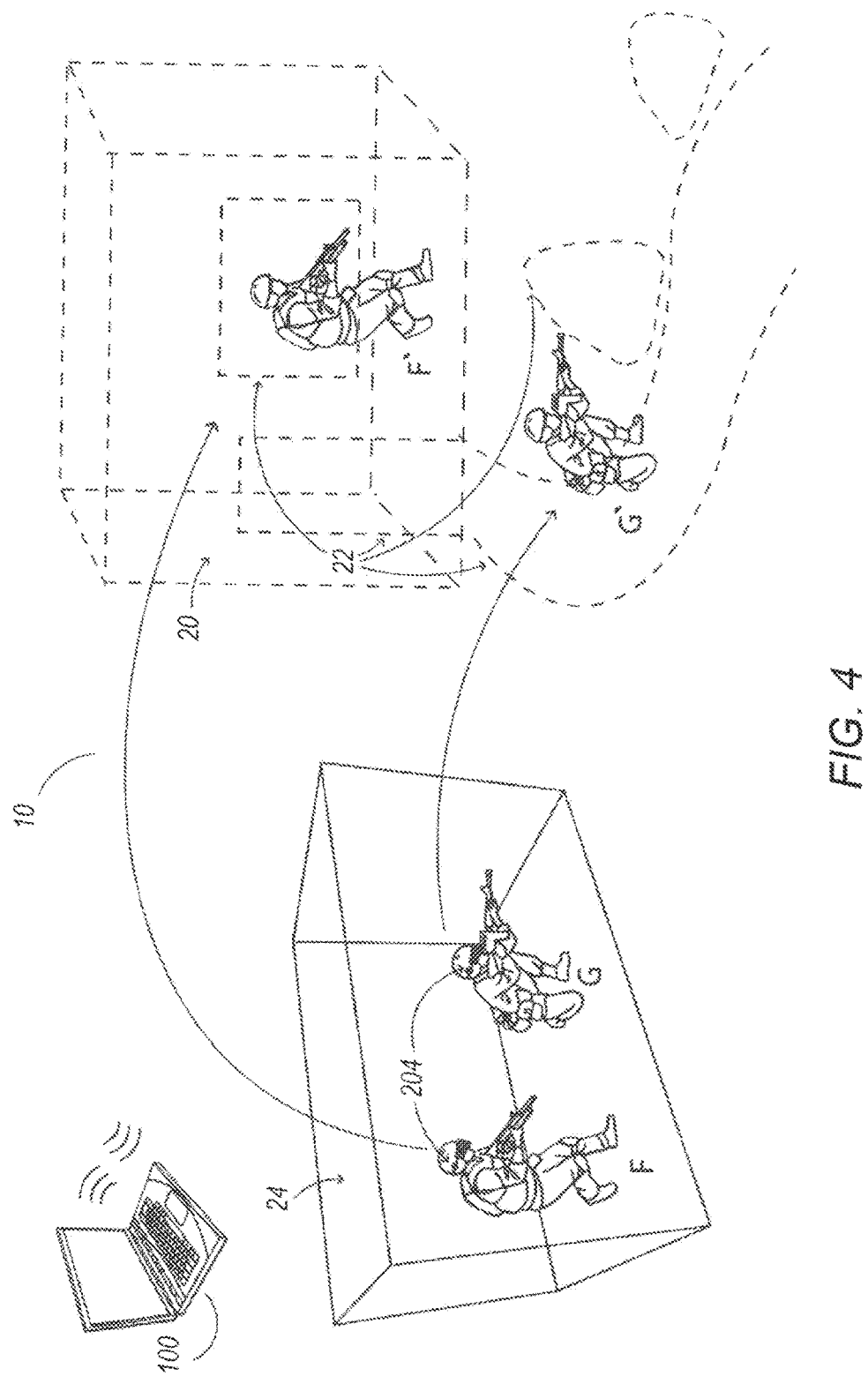
FIG. 4 constitutes a schematic perspective view of a VR scenario enacted during the use of a MR immersive system, according to some embodiments.

Reference is made to FIG. 4, which constitutes a schematic perspective view of a MR scenario enacted by the use of a MR immersive system 10 according to some embodiments of the invention. As shown, at least two participants, F and G, are occupying a restricted source space 24. According to some embodiments, controller 100 may execute a dynamic deformation to create at least two extensive object spaces 20 and 20'. According to some embodiments, first object space 20 may be a room to be cleared by conducting a tactical task as part of an urban warfare operation. The room to be cleared may be located on the ground and accessible by a walkway. According to some embodiments, second object space 20' may be the surroundings of said room and may require reconnoiter said walkway. According to some embodiments, controller 100 may divert participant F to enter the room through the walkway and clear it, while at the same time, controller 100 may divert participant G to reconnoiter the walkway. According to some embodiments, the MR scenario may comprise a walkway, a door and rocks as part of the object space layout 22 wherein said object may provide participants with a real sensation of warfare clearing or outdoor reconnoitering.

According to some embodiments, participants F and G are immersed in a VR scenario that enables them to conduct different tasks on completely different object spaces (participants' representations on the object space 20 and 20' are marked as participant F' and participant G' respectively). According to some embodiments, participants F and G may not have a direct line of sight between each other. In this case, participant F can communicate with participant G (and vice versa) through auditory means 204. The aforementioned MR scenario enables at least two participants to conduct different tasks within completely different surroundings while physically being in a restricted source space 24 or, alternatively, within two separated restricted source spaces 24.

According to some embodiments, MR immersive system 10 is a cost-effective system that uses off-the-shelf components such as, for example, head mounted displays (HMD) of manufactures such as HTC or Oculus (e.g. HTC Vive®, Oculus Rift®, Oculus Quest®, etc.).

According to some embodiments, MR immersive system 10 enables a real-time supervising feedback that may dynamically alter a MR scenario in accordance with certain considerations, for example, a supervisor observing participants immersed and operates within a MR scenario, can have a real-time influence on the MR scenario narrative and development. A supervisor can decide, following a performance evaluation of each participant, to alter the object space layout 22 and/or the object space 20 in order to observe participants' reaction or allowing participants to repeat a task until it will be satisfactorily performed.

According to some embodiments, MR immersive system 10 enables immediate debriefing option. Immediately after or while being immersed in a MR scenario. According to some embodiments, the debriefing can be conducted using auditory means 204 or as part of the MR scenario itself where the supervisor plays a part as part of the MR scenario or represented within the object space 20.

According to some embodiments, the current system may benefit from using as many realistic accessories (such as real guns, consoles, tools etc.), or at least be oblivious to a multitude of real-world objects within the source space 24.

Figure 5:
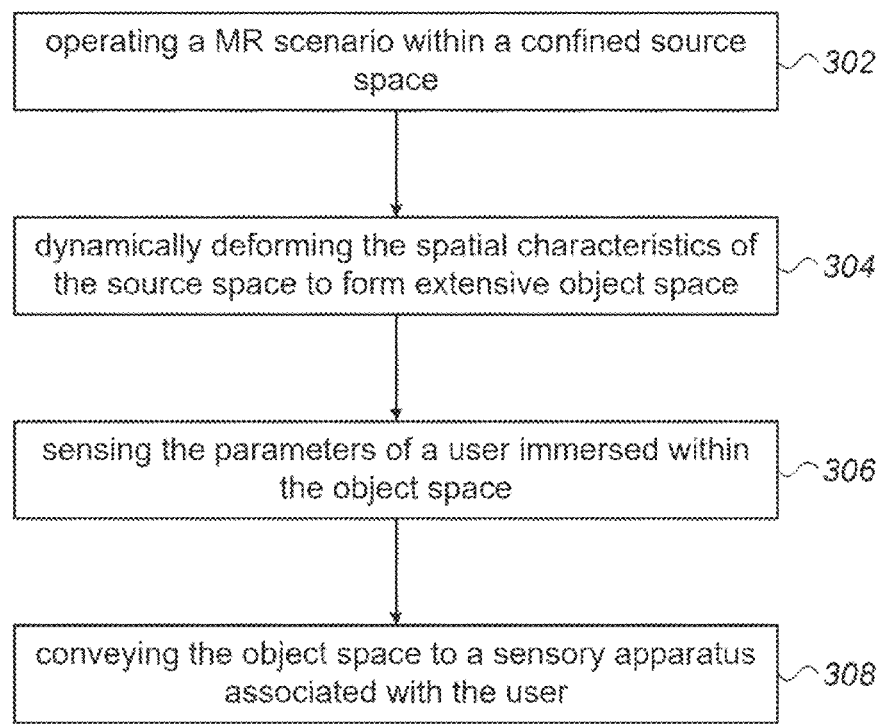
FIG. 5 constitutes a flowchart diagram illustrating a method of using a participant immersive system, according to some embodiments.

Reference is made to FIG. 5 which constitutes a flowchart diagram illustrating a method for conducting a mixed reality scenario using the MR immersive system 10, according to some embodiments of the invention. In operation 302, the method may include using the controller 100 to operate an MR scenario for at least one participant within a confined source space 24 which is the actual physical space that a participant occupies and operates within. In operation 304 the method may include dynamically deforming the spatial characteristics of the confined source space 24 to form an extensive (or spacious) and spatially altered object space 20. In operation 306 the method may include sensing the parameters of the at least one participant while immersed within the object space 20. These parameters can include, the bearings, vital signs, or other parameters such as, body temperature, sweating level, breathing rate, hyperventilation, brain waves, nervous system rate, etc. In operation 308 the method may include conveying the object space 20 to at least one sensory apparatus associated with at least one participant. The sensory apparatus can be, for example, an HMD configured to display 3D images to the participant.

According to some embodiments, multiple MR scenarios and object spaces 20 can be simulated while participants are physically in source space 24. This process may be obtained by a mathematical rendition of both stationary and dynamic real and virtual objects in a source space 24 and object space 20 and may include identifying actual and potential collisions between such objects. This process may further be obtained by using a Minkowski addition analysis of a two-dimensional (2D) reduction of said three-dimensional objects, as exemplified below.

According to some embodiments, a general mathematical representation may describe some embodiments of the invention, for example, P represents a source space, n represents the number of participants immersed in a MR scenario X and occupy said source space P. The same source space may be used for several MR scenarios at the same time but cannot contain more than one participant standing at an exact physical location at the same time—i.e. one participant cannot be at an exact spot within said source space that is currently occupied by another participant. According to some embodiments, real-life accessories/tools also subjected to the same position restriction.

According to some embodiments, m represents the number of shapes that forms the object space layout of an object space as part of an MR scenario. According to some embodiments, said shapes can be either static or dynamic objects or entities, for example, static shapes such as a wall, a car etc. or dynamic shapes such as an animal or an enemy soldier (which may carry a weapon or other operating accessory).

According to some embodiments, k represents the number of MR scenarios S (1 . . . k), wherein every MR scenario S is simulated by a polygonal representation Pi and includes m shapes, several participants and list of rules. The MR scenario rules correspond with the geometrical restrictions of the source space. For example, participant 1 has to remain in a certain distance from the real wall that is part of the source space during an MR scenario. According to some embodiments, all rules relates to the physical world restrictions of the source space and its influence on the respective object space during the enactment of a MR scenario, and are defined using geometrical terms such as distance, surface, radius etc.

According to some embodiments, MR scenarios can run simultaneously where their polygonal representations Pi (1 . . . k) are contained in source space P and none of them interfere with each other and, according to some embodiments, shapes m do not collide with each other or with the participants, and the participants do not collide with each other, thus the scene rules are kept.

Figure 6:
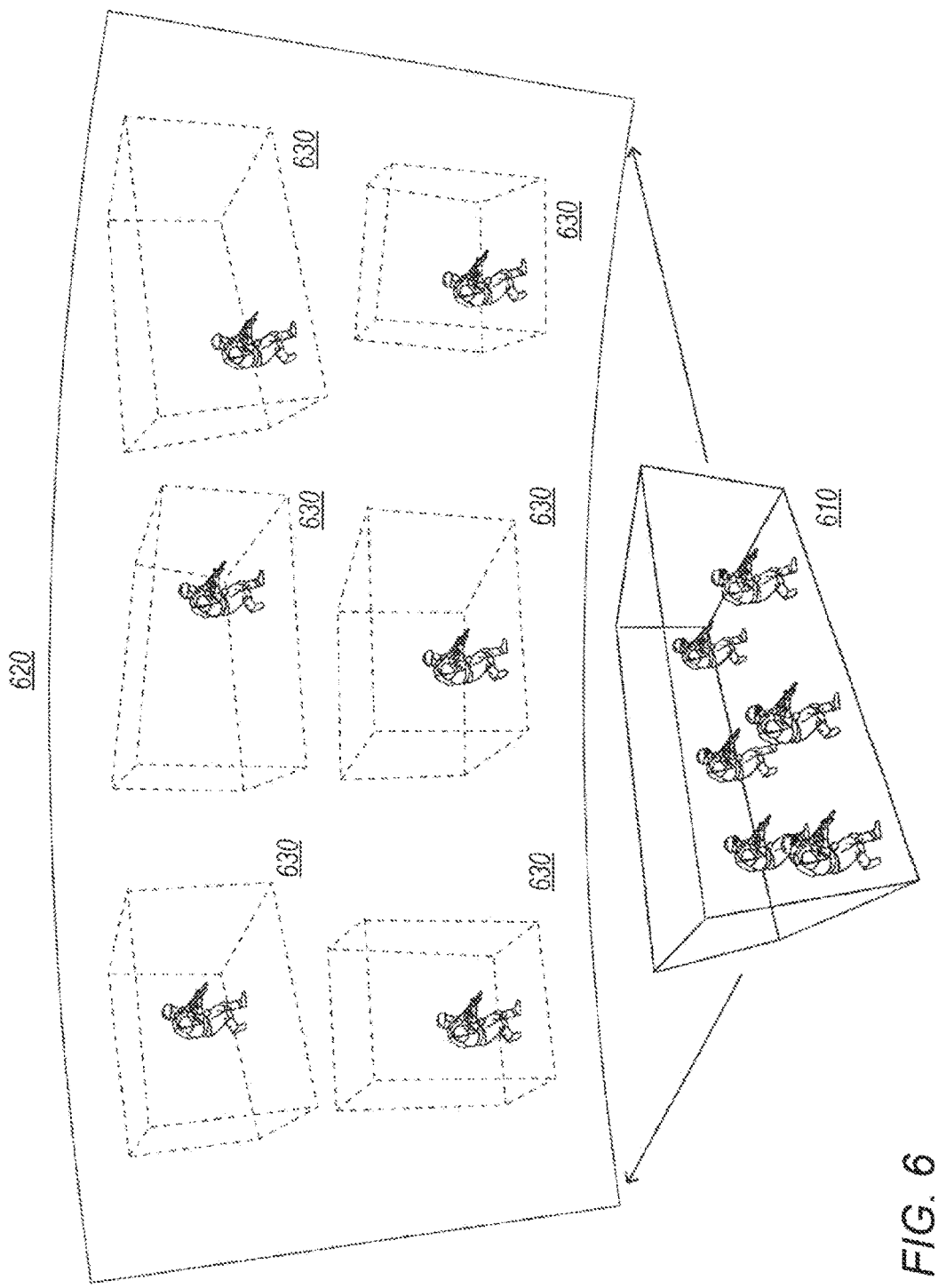
FIG. 6 constitutes a diagram illustrating source space and object spaces and tiles.

Reference is made to FIG. 6 which constitutes a diagram illustrating a source space and an object spaces and tiles forming a MR scenario enacted by the use of a MR immersive system 10, according to some embodiments of the invention. A person skilled in the art would appreciate that embodiments such as the aforementioned general mathematical representation that may include spatial alterations, shape transformations and other dynamically forming, can be materialized by various common mathematical means which dynamically deform and/or translate the object space into the available source space (available, because some of the source space may be already occupied by other MR operations/scenarios or physical objects). According to some embodiments, such deformation would be performed taking into account important scenario properties and their predefined scoring (as illustrated hereinafter in FIG. 7).

According to some embodiments, more important scenario properties will be maintained while object space and/or object tiles are mathematically deformed to fit into a source space. For example, object space 620 comprised of many potential object tiles 630, whereby object space 620 and object tiles 630 may be dynamically deformed so as to fit into source space 610. Such adaptation and selection of tiles to be deformed is operable by selection method (substantially illustrated hereinafter in FIG. 7).

According to some embodiments, some tiles 630 and their needed warping are predefined and stored in using controller 100 (not shown) to enable low system latency and for emulating a real-time user experience. According to some embodiments, tiles 630 and their needed warping are calculated on a consecutive basis in accordance with decision 720 (substantially illustrated hereinafter in FIG. 7) and thus saving on system resources. According to some embodiments, tiles 630 amount, type, characterization needed warping and so forth specifics are optimized while balancing between desired real-time user experience and system resources limitations or capacity.

Figure 7:
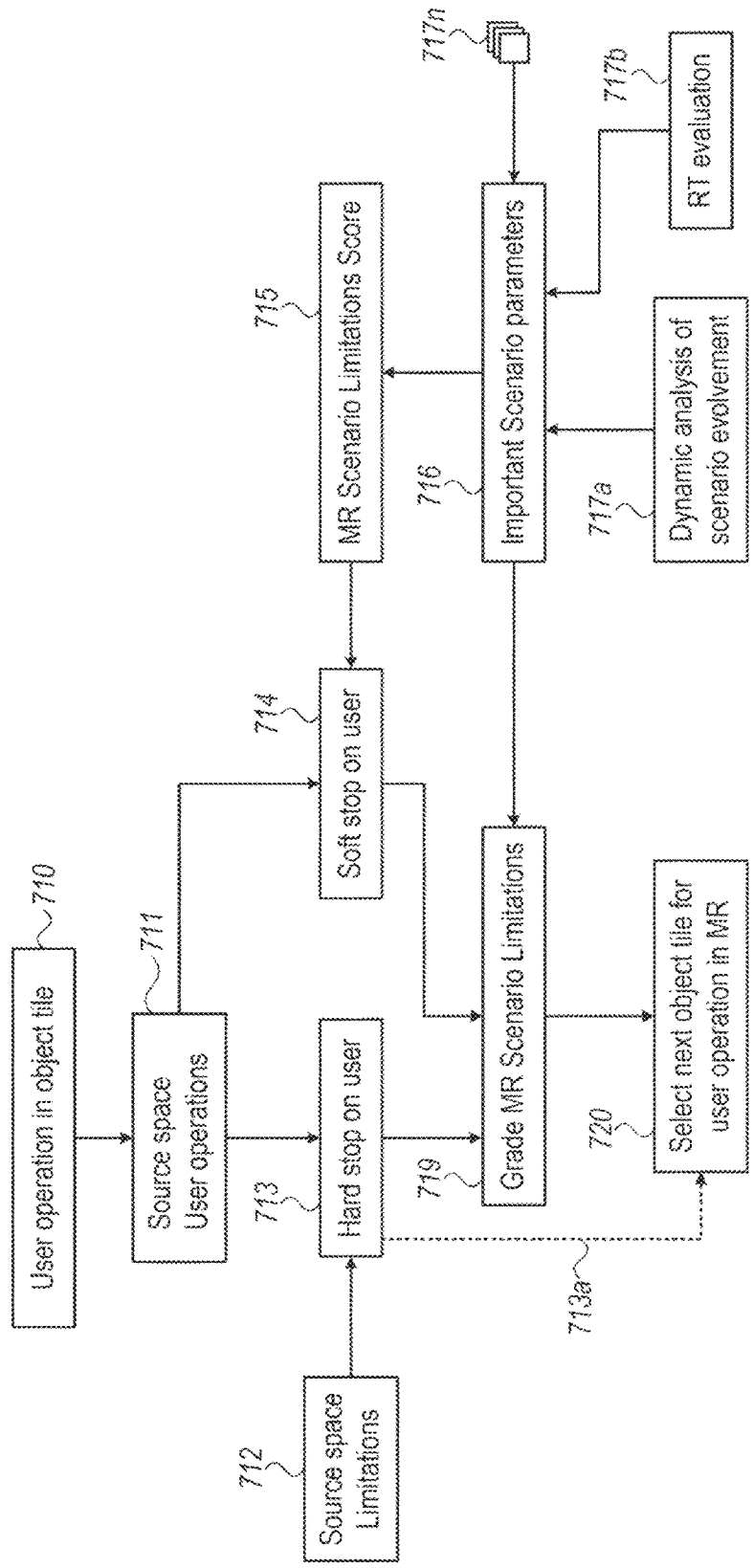
FIG. 7 constitutes a flowchart diagram illustrating a method of using important scenario properties scoring for object tile selection.

Reference is made to FIG. 7 which constitutes a flowchart diagram illustrating an example for a method of using important scenario properties scoring for object tile selection, during a MR scenario enacted by the use of a MR immersive system 10, according to some embodiments of the invention. According to some embodiments, a feature or a certain situation that is considered essential to the completion of an operation can be defined as an "important scenario property". For example, a constant and direct line of sight between participants from inside a room towards the reconnoiter participant on the walkway can be defined as an important scenario property (which allows, for example, sign communication between participants). Another example for important scenario property can be the firing distance from a participant to a target in comparison with a known firing range of a certain weapon. Another example for important scenario property can be an upcoming change in simulated virtual setting, such as an unexpected turn in a tunnel which trainee is mitigating. Another example for important scenario property can be the prioritizing of different participant's goals or actions.

According to some embodiments, whereby a participant operation in source space 711 is instigated by participant experiencing an object tile 710 and operating therein, the participant's said operations are evaluated against source space limitation 712 which may provide use with hard stop instructions 713 (such as to prevent collision with a physical wall), and against "soft" stops on user's 714 instigated by MR limitation score 715. According to some embodiments, the MR limitation score 715 is calculated in accordance with important scenario parameters 716 (which may incorporate various matters and issues such as real time evaluation considerations 717b, dynamic analysis of evolvement of scenario 717a, and so forth). The input of hard stop 713 on the participant, soft stop 714 on the participant and further important scenario parameters 716, are calculated so as to grade further scenario limitations 719.

According to some embodiments, in case hard stop 713 on the participant is of dominant value (i.e. actual collision with physical barrier is eminent) override 713a strongly affects selection of next object tile/s for user operation in MR scenario 720 so as to avert a detrimental effect to user's personal integrity; otherwise grade MR scenario limitations 719 are used to select next object tile for user operation in MR scenario 720.

According to some embodiments, dynamic deformation may be obtained by dimension scaling methods characterized by finding the multiplication factor which transforms dimensions from an object space into the desired dimension in a source space. For instance, if the available source space is a rectangle of dimension X, Y, Z and the object space is a rectangle dimensioned A, B, C, then the correlating scaling factors which would fit the object space into the available source space would be X/A, Y/B, Z/C.

Figure 8A:
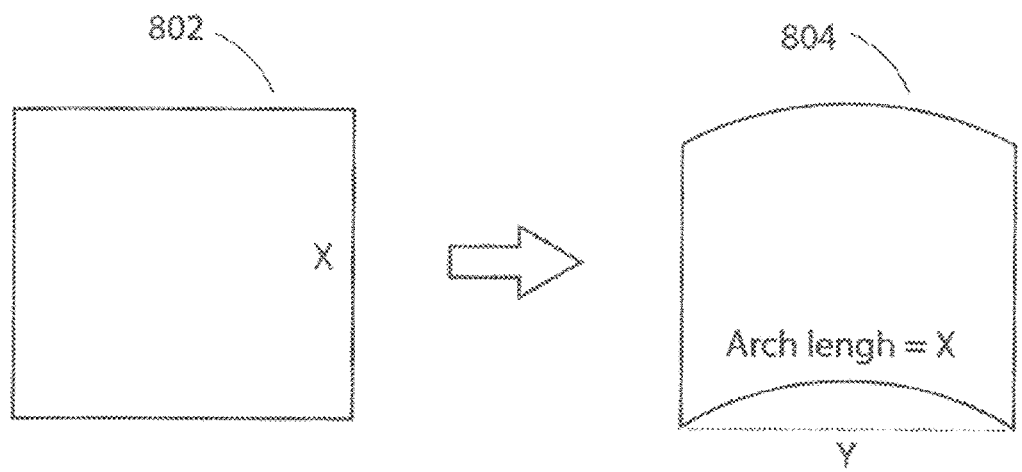
FIGS. 8a and 8b constitutes an example of warping deformation of a 2D object space to a constrained source space.
Figure 8B:
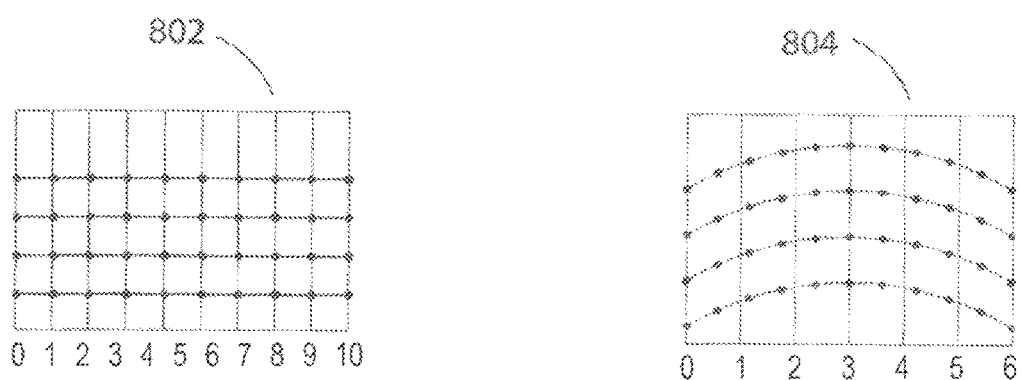

Reference is made to FIGS. 8a and 8b which constitutes an example of warping deformation of a 2D object space to a constrained source space, during a MR scenario enacted by the use of a MR immersive system 10, according to some embodiments of the invention. The system can receive an object space and choose to apply certain warp on it to make it fit in a given source space. For example, assume a given object space 802 is described by a cubical volume of dimension X, however a source space 804 cubical volume is Y wherein Y<X and wherein source space 804 is the only one available. According to some embodiments, the system will check a defined important scenario property. If no limiting constrains are found in those properties, the system may choose to apply a warp on the cubical space of object space 802 and map it to a spherical sector which is bounded by a cubical volume of dimension Y and thus would fit in the available source space. Such warping may be calculated using commonly known analytical geometry equations of arc length, circular sector length, and so forth dimensions and taking into account the preserving quantity that after the warp the length of the warped arch is still X. In effect, each point within the object space 802 has corresponding coordinates in the source space 804, as is exemplified in FIG. 8b.

Although the present invention has been described with reference to specific embodiments, this description is not meant to be construed in a limited sense. Various modifications of the disclosed embodiments, as well as alternative embodiments of the invention will become apparent to persons skilled in the art upon the reference to the description of the invention. It is, therefore, contemplated that the appended claims will cover such modifications that fall within the scope of the invention.

The invention claimed is:

1. A mixed reality (MR) immersive system, the system comprising:
    (i) a controller configured to operate at least one MR scenario;
    (ii) at least one sensory apparatus associated with at least one participant;
    said system deployable in an at least one finite source space physically occupied by the at least one participant, wherein said source space is configured to be dynamically deformed in each of three spatial dimensions into at least one extensive and spatially altered object space by executing a mathematical manipulation of 3D shape matrix expressions therein that enforces deformation in all three spatial dimensions, and
    wherein said object space is conveyed to the at least one sensory apparatus associated with the at least one participant such that said at least one participant senses through said sensory apparatus both the spatially altered object space and dynamically deformed source space.

2. The system of claim 1, wherein at least one sensor is configured to monitor the at least one participant's parameters.

3. The system of claim 1, wherein the sensory apparatus comprises a head-mounted display (HMD) configured to display images to the at least one participant.

4. The system of claim 1, wherein a safety mechanism prevents possible physical collisions between the participants themselves or between participants and physical objects that may be present within the source space.

5. The system of claim 1, wherein the object space is simulated by multiple image tiles that are dynamically deformed in each of three spatial dimensions to fit into the source space.

6. The system of claim 5, wherein the multiple image tiles characteristics are optimized to reduce latency and preserve system resources.

7. The system of claim 1, wherein the same source space may be used for several MR scenarios enacted at the same time.

8. The system of claim 1, wherein the object space's shape can be warped to fit a given source space while preserving said object space's measurements.

9. The system of claim 1, wherein the MR scenario is configured to dynamically form in each of three spatial dimensions at least two object sub-spaces adapted for at least two participants by executing a mathematical manipulation of 3D shape matrix expressions therein that enforces deformation in all three spatial dimensions.

10. The system of claim 9, wherein the at least two object sub-spaces are a replication of the same object space type.

11. The system of claim 9, wherein the at least two object sub-spaces are different arenas object sub-spaces.

12. The system of claim 9, wherein at least two participants may simultaneously conduct different tasks while being immersed in the at least two object sub-spaces.

13. The system of claim 1, wherein the at least one MR scenario is configured to dynamically inter-correspond and adapt in each of three spatial dimensions in accordance with scenario evolution and participant's actions.

14. The system of claim 1, wherein the system further comprises real-life accessories equipped with at least one haptic means.

15. The system of claim 14, wherein the haptic means can mimic a sensation of using and operating a real weapon.

16. The system of claim 14, wherein the haptic means can mimic a sensation of being hit by another participant.

17. A method for conducting a MR scenario, comprising the steps of:
   (i) operating, using a controller, at least one MR scenario that involves at least one participant present within a confined finite source space,
   (ii) dynamically deforming in each of three spatial dimensions the spatial characteristics of the source space to form an extensive and spatially altered object space by executing a mathematical manipulation of 3D shape matrix expressions therein that enforces deformation in all three spatial dimensions,
   (iii) conveying the at least one object space to at least one sensory apparatus associated with at least one participant such that said at least one participant senses through said sensory apparatus both the spatially altered object space and dynamically deformed source space.

18. The method of claim 17, wherein dynamically deforming the spatial characteristics of the source space forms at least two extensive and spatially altered object sub-spaces adapted for at least two participants.

\* \* \* \* \*